US009651743B2

(12) United States Patent
Costello, III et al.

(10) Patent No.: US 9,651,743 B2
(45) Date of Patent: May 16, 2017

(54) GRADIENT INDEX (GRIN) LENS HOLDERS EMPLOYING A RECESSED COVER, AND OPTICAL CONNECTORS AND METHODS INCORPORATING THE SAME

(71) Applicant: Corning Optical Communications LLC, Hickory, NC (US)

(72) Inventors: John Joseph Costello, III, Painted Post, NY (US); Michael de Jong, Colleyville, TX (US); Davide Domenico Fortusini, Ithaca (IT); Micah Colen Isenhour, Lincolnton, NC (US); Dennis Michael Knecht, Hickory, NC (US); James Phillip Luther, Hickory, NC (US); Nikolay Timofeyevich Timofeev, St. Petersburg (RU)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/197,956

(22) Filed: Mar. 5, 2014

(65) Prior Publication Data
US 2014/0185986 A1 Jul. 3, 2014

Related U.S. Application Data

(63) Continuation of application No. PCT/US2012/054054, filed on Sep. 7, 2012.
(Continued)

(51) Int. Cl.
*G02B 6/38* (2006.01)
*G02B 7/02* (2006.01)
(Continued)

(52) U.S. Cl.
CPC .............. *G02B 6/3853* (2013.01); *G02B 6/32* (2013.01); *G02B 6/3652* (2013.01); *G02B 7/02* (2013.01);
(Continued)

(58) Field of Classification Search
CPC ........... G02B 6/38; G02B 7/02; G02B 6/3853
(Continued)

(56) References Cited

U.S. PATENT DOCUMENTS

| 4,781,431 A | 11/1988 | Wesson et al. ............ 350/96.21 |
| 5,163,107 A | 11/1992 | Garriss |

(Continued)

FOREIGN PATENT DOCUMENTS

| AU | 199898138 B2 | 8/1999 |
| CA | 1193477 A | 9/1985 |

(Continued)

OTHER PUBLICATIONS

Patent Cooperation Treaty International Search Report, Application No. PCT/US2012/054054, Nov. 28, 2012, 7 pages.
(Continued)

*Primary Examiner* — Kaveh Kianni

(57) ABSTRACT

Gradient index (GRIN) lens holders employing groove alignment feature(s) and a recessed cover, as well as optical connectors and methods employing such GRIN lens holders, are disclosed. In one embodiment, the GRIN lens holder contains one or more internal groove alignment features configured to secure one or more GRIN lenses in the GRIN lens holder. The groove alignment features are also configured to accurately align the end faces of the GRIN lenses. The GRIN lens holder also contains a recessed cover having a front face that is negatively offset with respect to a mating surface of the GRIN lens holder. The GRIN lens holders disclosed herein can be provided as part of an optical fiber
(Continued)

ferrule and/or a fiber optic component or connector for making optical connections.

15 Claims, 11 Drawing Sheets

Related U.S. Application Data

(60) Provisional application No. 61/568,951, filed on Dec. 9, 2011, provisional application No. 61/533,986, filed on Sep. 13, 2011.

(51) Int. Cl.
    *G02B 6/32*     (2006.01)
    *G02B 6/36*     (2006.01)
    G02B 6/42     (2006.01)

(52) U.S. Cl.
    CPC .......... *G02B 6/3829* (2013.01); *G02B 6/3885* (2013.01); *G02B 6/4214* (2013.01); *G02B 6/4249* (2013.01); *Y10T 29/49826* (2015.01)

(58) Field of Classification Search
    USPC .......................................................... 385/33
    See application file for complete search history.

(56) References Cited

U.S. PATENT DOCUMENTS

| | | | |
|---|---|---|---|
| 5,168,537 A | 12/1992 | Rajasekharan et al. | |
| 5,333,225 A | 7/1994 | Jacobowitz et al. | |
| 5,548,677 A * | 8/1996 | Kakii et al. ...................... | 385/92 |
| 5,917,976 A * | 6/1999 | Yamaguchi ...................... | 385/88 |
| 6,056,448 A * | 5/2000 | Sauter et al. ................... | 385/92 |
| 6,272,272 B1 | 8/2001 | Ford | |
| 6,530,696 B1 * | 3/2003 | Ueda et al. ...................... | 385/60 |
| 6,633,700 B2 | 10/2003 | Bellman et al. | |
| 6,668,119 B2 | 12/2003 | Matsumoto et al. | |
| 6,823,109 B2 | 11/2004 | Sasaki et al. | |
| 7,269,317 B2 | 9/2007 | Blauvelt et al. | |
| 7,331,720 B1 | 2/2008 | McColloch | |
| 7,543,994 B2 | 6/2009 | McColloch | |
| 7,553,091 B2 | 6/2009 | McColloch | |
| 7,887,243 B2 * | 2/2011 | Abel et al. ...................... | 385/73 |
| 8,277,130 B2 | 10/2012 | Nishimura et al. | |
| 8,449,205 B2 | 5/2013 | Little et al. | |
| RE44,664 E | 12/2013 | McColloch | |
| 8,651,749 B2 | 2/2014 | Dainese et al. | |
| 8,757,893 B1 | 6/2014 | Isenhour et al. | |
| 8,774,577 B2 | 7/2014 | Benjamin et al. | |
| 8,781,273 B2 | 7/2014 | Benjamin et al. | |
| 9,022,669 B2 | 5/2015 | de Jong et al. | |
| 9,069,142 B2 | 6/2015 | Fortusini et al. | |
| 9,151,900 B2 | 10/2015 | Benjamin et al. | |
| 9,151,912 B2 | 10/2015 | de Jong et al. | |
| 9,201,201 B2 | 12/2015 | Charbonneau-Lefort et al. | |
| 9,261,651 B2 | 2/2016 | Benjamin et al. | |
| 9,304,265 B2 | 4/2016 | Isenhour et al. | |
| 9,435,917 B2 | 9/2016 | DeMeritt et al. | |
| 2002/0031301 A1 | 3/2002 | Sasaki et al. | |
| 2002/0064347 A1 * | 5/2002 | Mertz et al. ...................... | 385/52 |
| 2002/0168135 A1 * | 11/2002 | Dautartas et al. ............... | 385/17 |
| 2002/0172474 A1 | 11/2002 | Kim et al. | |
| 2003/0034438 A1 * | 2/2003 | Sherrer et al. ................ | 250/216 |
| 2003/0113071 A1 * | 6/2003 | Kim et al. ........................ | 385/76 |
| 2003/0113077 A1 * | 6/2003 | Xu et al. .......................... | 385/93 |
| 2003/0128437 A1 | 7/2003 | Sato et al. ...................... | 359/641 |
| 2003/0201462 A1 * | 10/2003 | Pommer et al. ............. | 257/200 |
| 2003/0210873 A1 * | 11/2003 | Moretti .............................. | 385/89 |
| 2004/0005124 A1 * | 1/2004 | Gallup et al. .................. | 385/88 |
| 2004/0081405 A1 | 4/2004 | Stevens et al. | |
| 2004/0109646 A1 * | 6/2004 | Anderson et al. ............. | 385/71 |
| 2006/0039655 A1 * | 2/2006 | Wilson ............................ | 385/79 |
| 2006/0045421 A1 * | 3/2006 | Baets et al. .................... | 385/33 |
| 2006/0140544 A1 * | 6/2006 | Morimoto et al. ............. | 385/59 |
| 2006/0154884 A1 | 7/2006 | Buchwald | |
| 2006/0245694 A1 * | 11/2006 | Chen et al. ...................... | 385/71 |
| 2007/0147733 A1 | 6/2007 | Matsumura et al. ........... | 385/34 |
| 2008/0095501 A1 | 4/2008 | McColloch | |
| 2008/0095506 A1 | 4/2008 | McColloch | |
| 2008/0166094 A1 | 7/2008 | Bookbinder et al. | |
| 2009/0154884 A1 | 6/2009 | Chen et al. | |
| 2009/0213894 A1 | 8/2009 | Grapov et al. | |
| 2009/0252455 A1 | 10/2009 | Ohta et al. | |
| 2010/0028563 A1 | 2/2010 | Ota | |
| 2010/0135618 A1 | 6/2010 | Howard et al. | |
| 2011/0064357 A1 * | 3/2011 | Chang ............................. | 385/33 |
| 2011/0091167 A1 | 4/2011 | Nishimura | |
| 2011/0116746 A1 * | 5/2011 | Chen ............................... | 385/74 |
| 2011/0150399 A1 | 6/2011 | Sabano et al. | |
| 2011/0229077 A1 | 9/2011 | Fortusini et al. | |
| 2011/0255825 A1 | 10/2011 | Ko et al. | |
| 2011/0317959 A1 | 12/2011 | Ohta et al. | |
| 2012/0027346 A1 * | 2/2012 | Castagna et al. ............... | 385/33 |
| 2012/0093462 A1 * | 4/2012 | Childers et al. ................ | 385/33 |
| 2012/0155803 A1 * | 6/2012 | Benjamin et al. .............. | 385/33 |
| 2012/0163754 A1 * | 6/2012 | Benjamin et al. .............. | 385/33 |
| 2012/0177327 A1 | 7/2012 | DeMeritt et al. | |
| 2012/0189252 A1 | 7/2012 | Bhagavatula et al. | |
| 2012/0227346 A1 | 9/2012 | Tsambasis | |
| 2012/0251045 A1 * | 10/2012 | Budd et al. ...................... | 385/33 |
| 2012/0321249 A1 | 12/2012 | DeMeritt et al. | |
| 2012/0328245 A1 | 12/2012 | Lin | |
| 2014/0003767 A1 | 1/2014 | de Jong et al. | |
| 2014/0143996 A1 * | 5/2014 | Bhagavatula et al. ......... | 29/428 |
| 2014/0178010 A1 | 6/2014 | de Jong et al. | |
| 2014/0185991 A1 | 7/2014 | de Jong et al. | |
| 2014/0308002 A1 | 10/2014 | Benjamin et al. | |
| 2014/0308003 A1 | 10/2014 | Benjamin et al. | |
| 2016/0202422 A1 | 7/2016 | de Jong et al. | |

FOREIGN PATENT DOCUMENTS

| | | | | |
|---|---|---|---|---|
| CA | 2373226 A1 | 8/2002 | | |
| CN | 102147508 A | 8/2011 | | |
| CN | 101828137 B | 9/2012 | | |
| CN | 102082342 B | 11/2013 | | |
| CN | 102122035 B | 8/2014 | | |
| DE | 19932907 A1 | 2/2001 | ............... | G02B 6/43 |
| EP | 0393829 A2 | 10/1990 | | |
| EP | 0760488 A1 | 3/1997 | ............... | G02B 6/38 |
| EP | 0860720 A1 | 8/1998 | ............... | G02B 6/24 |
| EP | 1237021 A2 | 9/2002 | | |
| EP | 1447695 B1 | 4/2009 | | |
| FR | 2545617 | 11/1984 | ............... | G02B 7/26 |
| GB | 2097550 A | 11/1982 | | |
| GB | 2359901 A | 9/2001 | ............... | G02B 6/38 |
| JP | 57-76509 A | 5/1982 | ............... | G02B 5/14 |
| JP | 57-139704 A | 8/1982 | ............... | G02B 5/00 |
| JP | 57-158824 A | 9/1982 | ............... | G02B 7/26 |
| JP | 63174004 A | 7/1988 | | |
| JP | 1988293510 A | 11/1988 | | |
| JP | 2001-4863 A | 1/2001 | ............... | G02B 6/24 |
| JP | 2004-219478 A | 8/2004 | ............... | G02B 6/32 |
| JP | 2007041222 A | 2/2007 | | |
| JP | 2007163969 A | 6/2007 | | |
| JP | 2011116955 A | 6/2011 | | |
| JP | 4742729 B2 | 8/2011 | | |
| WO | 9734176 A1 | 9/1997 | | |
| WO | WO00/70381 | 11/2000 | ............... | G02B 6/38 |
| WO | 0111409 A2 | 2/2001 | | |
| WO | 02056076 A2 | 7/2002 | | |
| WO | 02057826 A1 | 7/2002 | | |
| WO | WO02/057826 A1 | 7/2002 | ............... | G02B 6/36 |
| WO | 03076993 A1 | 9/2003 | | |
| WO | 2006108024 A1 | 10/2006 | | |
| WO | 13086117 A2 | 6/2013 | | |
| WO | 13086127 A2 | 6/2013 | | |

(56) References Cited

FOREIGN PATENT DOCUMENTS

OTHER PUBLICATIONS

Zickar, M., et al., "MEMS compatible micro-GRIN lenses for fiber to chip coupling of light," Optics Express, vol. 14, Issue 10, 2006, pp. 4237-4249.
Nakagawa, G., et al., "Lens-Coupled Laser Diode Module Integrated on Silicon Platform," Journal of Lightwave Technology, vol. 14, No. 6, Jun. 1996, pp. 1519-1523.
Chanclou et al; "Design and Demonstration of a Multicore Single-Mode Fiber Coupled Lens Device"; Optics Communications; 233; (2004) 333-339.
CN2012800434902 Search Report Dated Feb. 16, 2015.
CN2012800642479 Office Action Dated Apr. 17, 2015.
CN2012800647985 Search Report Dated Apr. 23, 2015.
Cusworth et al; "Angular Tilt Misalignment Loss at a Grin Rod Lens Coupler"; Applied Optics, vol. 25, No. 11; Jun. 1, 1986; p. 1775-1779.
Emkey et al; "Analysis and Evaluation of Graded-Index Fiber-Lenses"; Journal of Lightwave Technology, vol. LT5, No. 9, Sep. 1987, p. 1156-1164.
Gilsdorf et al; "Single-Mode Fiber Coupling Effieciency With Graded-Index Rod Lenses"; Applied Optics, vol. 33, No. 16, Jun. 1, 1994 p. 3440-3445.
Gradient-Index Lenses, Optical Components; www.cvimellesgriot.com.
International Search Report and Written Opinion of the International Searching Authority; PCT/US2012/054059; Mailed May 3, 2013; 29 Pages.
International Search Report and Written Opinion of the International Searching Authority; PCT/US2012/068159 Mailed Jul. 4, 2013; 20 Pages.
International Search Report of the International Searching Authority; PCT/US2012/068144 Mailed Jul. 4, 2013.
Palais; "Fiber Coupling Using Graded-Index Rod Lenses"; Applied Optics, vol. 19, No, 12, Jun. 15, 1980, pp. 2011-2018.
Senior et al; "Misalignment Losses at Multimode Graded-Index Fiber Splices and Grin Rod Lens Couplers"; Applied Optics, vol. 24, No. 7: Apr. 1, 1985; p. 977-983.
Tomlinson; "Applications for Grin-Rod Lenses in Optical Fiber Communication Systems"; Applied Optics: vol. 19, No. 7, Apr. 1, 1980: p. 1127-1138.

\* cited by examiner

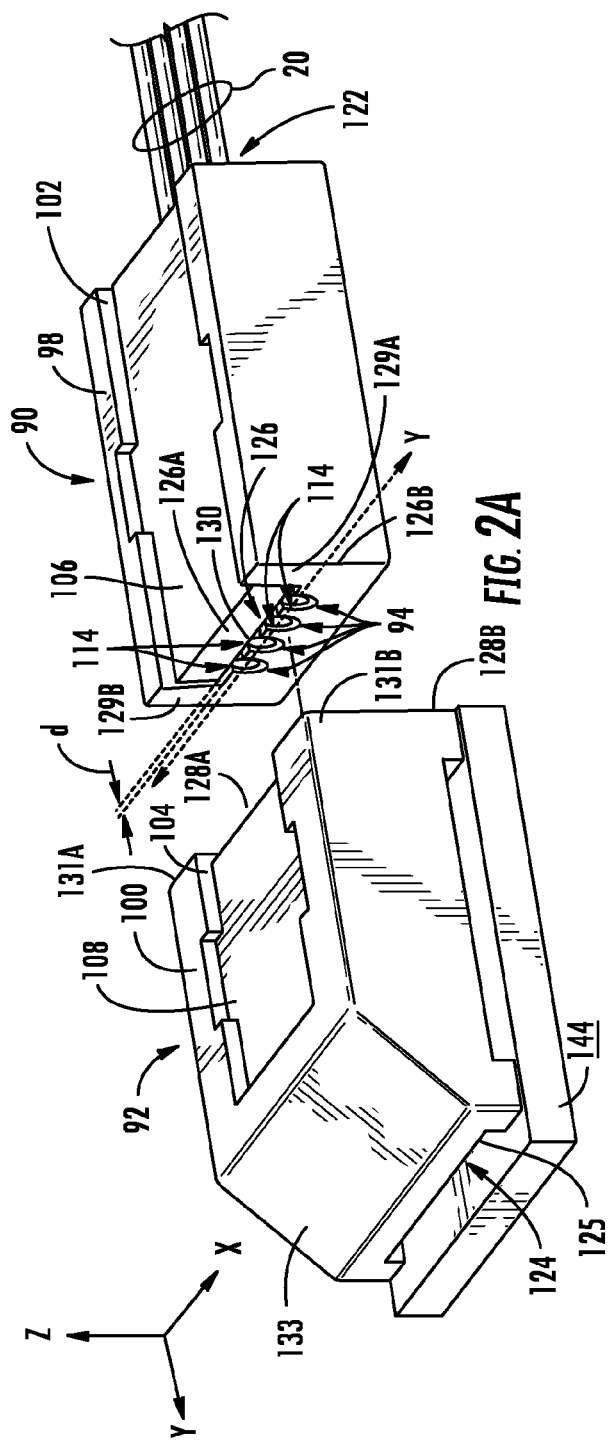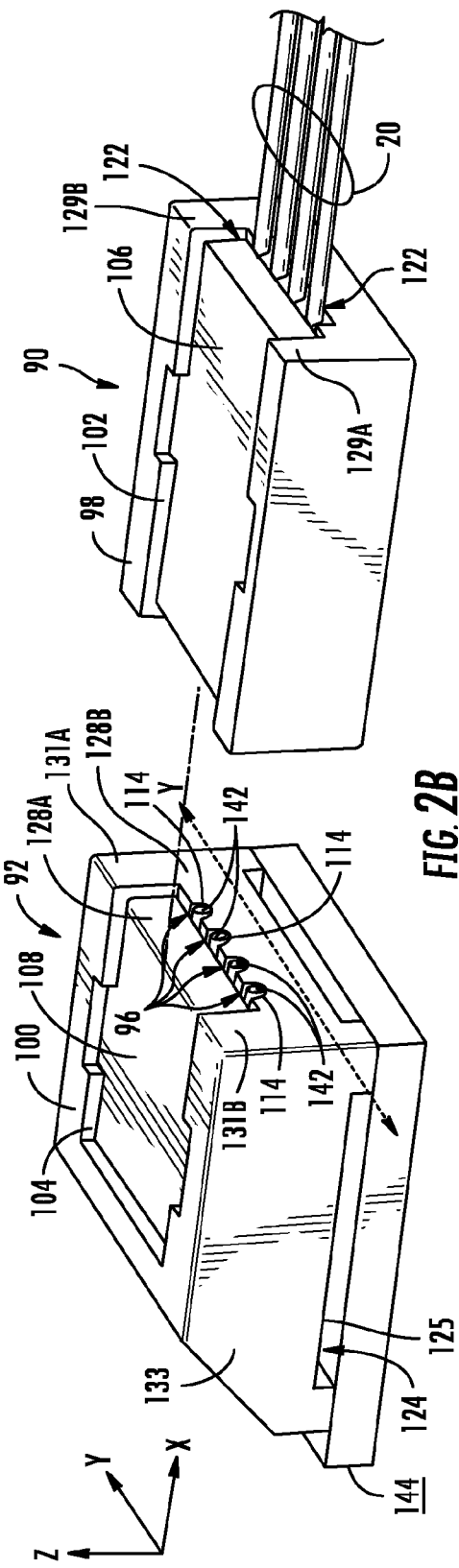

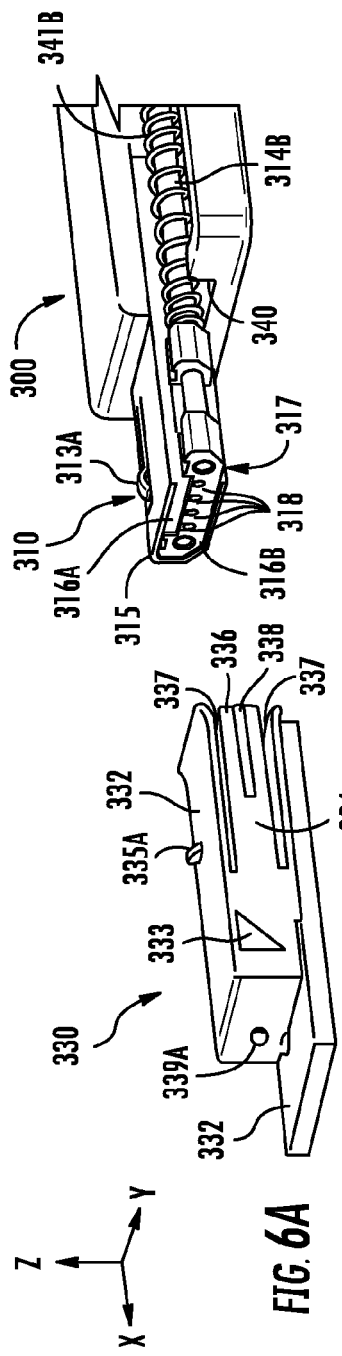
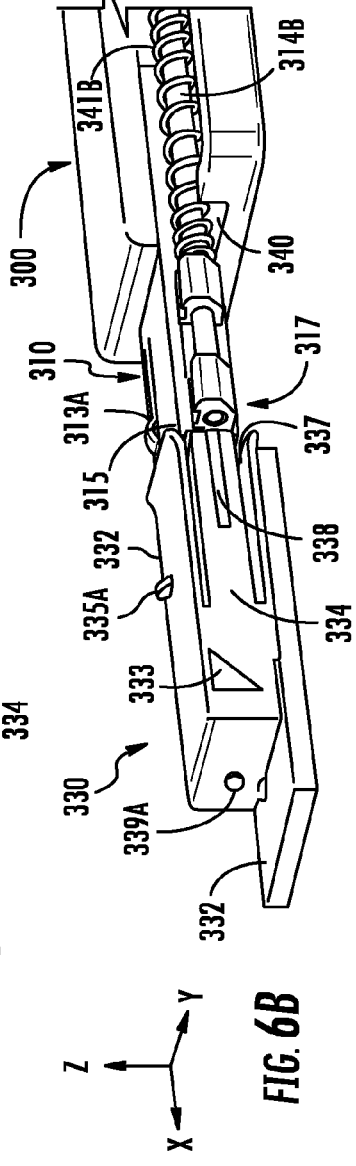
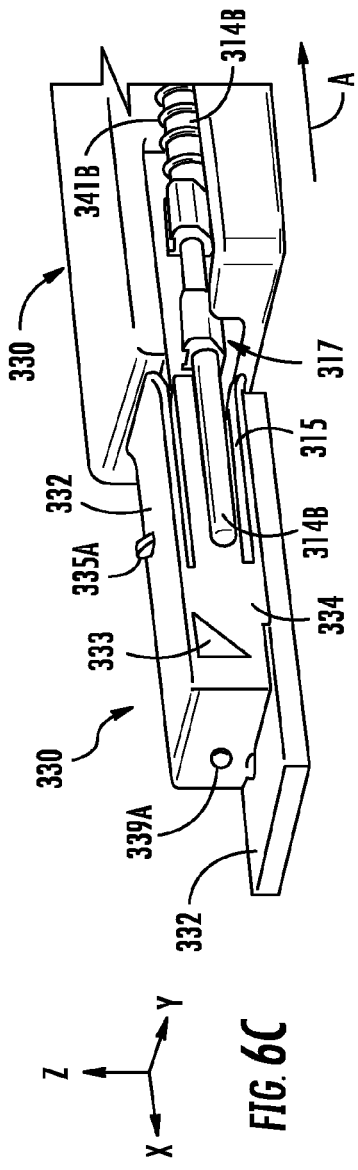
FIG. 6A
FIG. 6B
FIG. 6C

GRADIENT INDEX (GRIN) LENS HOLDERS EMPLOYING A RECESSED COVER, AND OPTICAL CONNECTORS AND METHODS INCORPORATING THE SAME

RELATED APPLICATIONS

This application is a continuation of International Application No. PCT/US12/54054 filed Sep. 7, 2012, which claims the benefit of priority to U.S. Application No. 61/568,951 filed on Dec. 9, 2011, and U.S. Application No. 61/533,986 filed on Sep. 13, 2011, the content of which is relied upon and incorporated herein by reference in its entirety.

BACKGROUND

Field of the Disclosure

The technology of the disclosure relates to GRIN lens holders configured to support gradient index (GRIN) lens, wherein the GRIN lens holders may be employed in plugs, receptacles and the like for facilitating optical connections.

Technical Background

Benefits of optical fiber include extremely wide bandwidth and low noise operation. Because of these advantages, optical fiber is increasingly being used for a variety of applications, including, but not limited to, broadband voice, video, and data transmission as end-users require more bandwidth. Fiber optic networks employing optical fiber are being developed and used to deliver voice, video, and data transmissions to subscribers over both private and public networks. As optical cable assemblies begin to be utilized in consumer electronics applications for transferring data between electronic devices at faster speeds the limitations of conventional telecommunication cable assembly designs are realized. Although telecommunication fiber optic networks often include separated connection points linking optical fibers to provide "live fiber" from one connection point to another connection point using cable assemblies, the needs and environment for consumer application cable assemblies are much different. In this regard, since conventional fiber optic equipment is located in data distribution centers, central offices, or other clean environments for supporting optical fiber interconnections and typically do not experience the large number of mating cycles like will be required for consumer electronic applications. Moreover, telecommunication cable assemblies are high-precision products that are typically protected from dirt, debris and the like; whereas, consumer electronic devices will need to operate in environments where exposure to dirt and debris will be a common occurrence.

By way of example, conventional fiber optic connectors for telecommunications use a flat end-faced multi-fiber ferrules for facilitating multiple direct optical fiber-to-optical fiber connections between the fiber optic connector supporting the ferrule and other fiber optic connectors or other devices having an optical connection. In this regard, it is important that fiber optic connectors are designed to allow the end faces of the optical fibers disposed in the ferrule to be placed into contact or closely spaced with an optical connection or other optical fiber for light transfer. These conventional multi-fiber, fiber optic connectors used for the telecommunication applications require a time-consuming manufacturing process for preparing a precision surface for direct optical fiber-to-optical fiber mating. By way of example, after the optical fibers are secured so the optical fiber extends beyond the mating end face, the excess fiber is removed by laser cleaving and the remaining protruding fiber is mechanically polished using abrasives for obtaining a precision end face with a highly planar array for maintaining tight alignment of optical fibers between connectors. When these connectors are mated, the end faces of the fibers touch providing for low-loss across the optical interface, but precise polishing is required to obtain this type of mating geometry. This high precision polishing is costly and difficult since it is time-consuming requires equipment and consumables for polishing and multiple manufacturing steps. Moreover, this type of construction is not well suited for the large number of mating cycles that a consumer device application is expected to experience. Thus, conventional constructions and methods for making cable assemblies are not suitable for cable assemblies directed to consumer devices for these and other reasons.

SUMMARY OF THE DETAILED DESCRIPTION

Fiber optic connectors having lens holders are disclosed to facilitate optical connections for the transfer of light signals between devices. For example, optical fibers can be optically connected to another optical device, such as a light-emitting diode (LED), laser diode, or opto-electronic device for light/signal transfer. As another example, optical fibers can be optically connected to other optical fibers through mated fiber optic connectors. In any of these cases, it is important that the end face of an optically connected optical fiber be precisely aligned with the optical device or other optical fiber to avoid or reduce coupling loss of the signal. For example, the optical fiber is disposed through a portion of a lens holder body that precisely locates the optical fiber with relation to the fiber optic lens.

Gradient index (GRIN) lenses offer an alternative to precision polishing used in telecommunication-based connectors that have optical fiber-to-optical fiber mating. GRIN lenses focus light through a precisely controlled radial variation of the lens material's index of refraction from the optical axis to the edge of the lens. The internal structure of this index gradient can dramatically reduce the need for high precision polishing and results in a simple, compact lens. This allows a GRIN lens with flat surfaces to collimate light emitted from an optical fiber or to focus an incident beam into an optical fiber. The GRIN lens can be provided in the form of a glass rod that is disposed in a lens holder as part of a fiber optic connector. The flat surfaces of a GRIN lens allow easy bonding or fusing of one end to an optical fiber disposed inside the fiber optic connector with the other end of the GRIN lens disposed on the ferrule end face. The flat surface on the end face of a GRIN lens can reduce aberrations, because the end faces can be polished to be planar to slightly inset with respect to the end face of the ferrule. The flat surface of the GRIN lens allows for easy cleaning of end faces of the GRIN lens by the end user, which is advantageous since the assembly must withstand large numbers of mating/unmating cycles. It is important that the GRIN lens holder be designed with internal holders that place and secure the GRIN lenses in alignment with the desired angular accuracy (i.e., tilt) to avoid or reduce coupling loss.

Embodiments disclosed herein include gradient index (GRIN) lens holders employing groove alignment feature(s) and a recessed cover for use in optical connectors, receptacles and the like. Non-limiting examples of such optical connectors include plugs and receptacles. In one embodiment, the GRIN lens holder contains one or more internal groove alignment features configured to secure the one or more GRIN lenses in the GRIN lens holder. The groove alignment features are also configured to accurately align the end faces of the GRIN lenses in a quick, simple and reliable manner for consumer applications. The recessed cover has a front face that is recessed from a mating face of the GRIN lens holder. With this arrangement, the front face does not contribute to the mechanical coupling of the GRIN lens holder to a mated connector or receptacle. The GRIN lens holders disclosed herein can be provided as part of an optical fiber ferrule and/or a fiber optic component or connector for making optical connections. A fiber optic connector containing the GRIN lens holders disclosed herein may be optically connected to one or more optical fibers in another fiber optic connector or to an optical device, such as a laser-emitting diode (LED), laser diode, vertical-cavity surface-emitting laser (VCSEL), or opto-electronic device for light transfer.

In this regard, in one embodiment, a gradient index (GRIN) lens holder includes a lens holder body including a mating face for mating with a mated GRIN lens holder and an internal chamber. At least one groove alignment feature is disposed in the internal chamber of the lens holder body. The at least one groove alignment feature is configured to support at least one GRIN lens disposed in the internal chamber. The GRIN lens holder further includes a recessed cover comprising a front face, wherein the recessed cover is disposed in the internal chamber such that the front face of the recessed cover is negatively offset with respect to the mating face of the lens holder body.

In another embodiment, an optical connector includes a connector housing that defines an optical connector opening, a first pin and a second pin longitudinally disposed within the connector housing, a gradient index (GRIN) lens holder, a first bias member disposed about the first pin, and a second bias member disposed about the second pin. The GRIN lens holder includes a mating face for mating with a mated GRIN lens holder, an internal chamber, a recessed floor disposed in the internal chamber, a first raised side disposed on a first side of the recessed floor, and a second raised side disposed on a second side of the recessed floor. At least one groove alignment feature is disposed in the recessed floor of the internal chamber of the lens holder body. The at least one groove alignment feature is configured to support at least one GRIN lens disposed in the internal chamber. The GRIN lens holder further includes a recessed cover comprising a front face, wherein the recessed cover is disposed in the internal chamber between the first raised side and the second raised side of the lens holder body such that the front face of the recessed cover is negatively offset with respect to the mating face of the lens holder body and the at least one end portion of the at least one GRIN lens. The first bias member is disposed about the first pin between a rear surface of the lens holder body and a first bias member engagement surface of the connector housing. The second bias member is disposed about the second pin between the rear surface of the lens holder body and a second bias member engagement surface of the connector housing.

In yet another embodiment, a method of providing a gradient index (GRIN) lens for a fiber optic connector includes providing a lens holder body having a mating face for mating with a mated GRIN lens holder, an internal chamber, a recessed floor disposed in the internal chamber, a first raised side disposed on a first side of the recessed floor, and a second raised side disposed on a second side of the recessed floor. Additionally, the method includes disposing at least one GRIN lens in at least one groove alignment feature disposed in the internal chamber of the lens holder body. The method further includes disposing a recessed cover having a front face between the first raised side and the second raised side of the lens holder body such that the front face of the recessed cover is negatively offset with respect to the mating face of the lens holder body and the first end portion of the at least one GRIN lens.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 2A is a perspective view of the GRIN lens holder of the plug of FIG. 1 positioned for mating with a GRIN lens holder for a receptacle, to optically connect GRIN lenses disposed in the GRIN lens holder of the plug with the GRIN lenses disposed in the GRIN lens holder of the receptacle;

FIG. 2B is another perspective view of the GRIN lens holder of the plug of FIG. 1 and the GRIN lens holder of the receptacle in FIG. 2A in an unmated condition;

FIG. 6A is a partial cutaway, perspective view of the optical connector of FIG. 5A approaching the receptacle connector of FIG. 5B;

FIG. 6B is a partial cutaway, perspective view of the optical connector of FIG. 5A making initial contact with the receptacle connector of FIG. 5B; and FIG. 6C is a partial cutaway, perspective view of the optical connector of FIG. 5A fully engaged with the receptacle connector of FIG. 5B with the GRIN lens holder of the plug translating on pins.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include gradient index (GRIN) lens holders and optical connectors employing groove alignment feature(s) and a recessed cover. Non-limiting examples of connectors include plugs, receptacles, and the like. In one embodiment, the GRIN lens holder contains one or more internal groove alignment features configured to secure the one or more GRIN lenses in the GRIN lens holder. The groove alignment features are also configured to accurately align the end faces of the GRIN lenses with the lens holder mating face and with the optical fibers within the lens holder. The recessed cover has a front face that is negatively offset from a mating face of the GRIN lens holder. With this arrangement, the front face does not contribute to the mechanical coupling of the GRIN lens holder to a mated plug or receptacle.

The GRIN lens holders disclosed herein provide part of a mating face for the fiber optic component or connector for making optical connections. A fiber optic connector containing the GRIN lens holders disclosed herein may be optically connected to one or more optical fibers in another fiber optic connector or to an optical device, such as a laser-emitting diode (LED), laser diode, vertical-cavity surface-emitting laser (VCSEL), or opto-electronic device for light transfer. As a non-limiting example, the GRIN lens holders disclosed herein can be provided as part of a plug, receptacle or the like containing one or more optical fibers therein for establishing optical connections.

Figure 1:
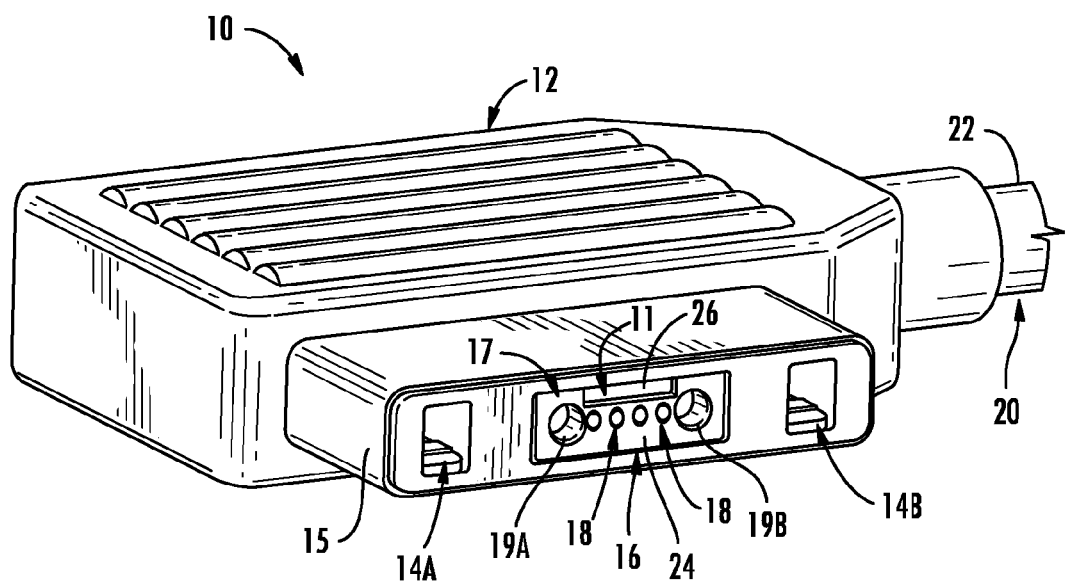
FIG. 1 is a perspective view of an exemplary cable plug employing a gradient index (GRIN) lens holder comprised of a lens holder body and a recessed cover.

In this regard, FIG. 1 is a perspective view of an exemplary optical connector 10 employing a GRIN lens holder configured to support and align GRIN lenses. The optical connector 10 in this embodiment is provided in the form of a plug 12. For example, the plug 12 may be a fiber optic connection plug that exclusively supports optical components for establishing optical connections. Alternatively, the plug 12 may also optionally include electrical components, such as power conductors 14A, 14B disposed in the plug 12 for establishing electrical connections, as a non-limiting example. It should be understood that embodiments are not limited to the configurations of the exemplary optical connector 10 depicted in FIG. 1, but that the concepts of the GRIN lens holder disclosed may be applied to any suitable design.

With continuing reference to FIG. 1, the plug 12 in this embodiment employs a gradient index (GRIN) lens holder 16 to support optical components for establishing optical connections. The GRIN lens holder 16 is disposed in a connector housing 15 of the plug 12. The GRIN lens holder 16 could be disposed in the connector housing 15, as an example. As discussed in more detail below, the GRIN lens holder 16 is configured to support and align one or more GRIN lenses 18 disposed in the GRIN lens holder 16. For example, the GRIN lens holder 16 disposed in the plug 12 in FIG. 1 is configured to support any suitable number of lenses such as up to four (4) GRIN lenses 18 or more. The GRIN lenses 18 are optically coupled or fused to optical fibers 20 disposed in a cable 22 secured to the plug 12. In this manner, an optical connection made to the GRIN lenses 18 disposed in the GRIN lens holder 16 through a mating of the plug 12 to a receptacle or other optical component establishes an optical connection to the optical fibers 20. Alignment openings 19A, 19B may be disposed in the plug 12 to assist in alignment of the plug 12 to a receptacle when the plug 12 is mated to a receptacle.

The GRIN lenses 18 focus light through a precisely controlled radial variation of the lens material's index of refraction from the optical axis to the edge of the lens. The internal structure of this index gradient can dramatically reduce the need for tightly controlled surface curvatures and results in a simple, compact lens. This allows the GRIN lenses 18 with flat surfaces to collimate light emitted from the optical fibers 20 or to focus an incident beam into the optical fibers 20. As will be described in more detail below, the GRIN lenses 18 are provided in the form of glass rods that are disposed in the GRIN lens holder 16. The flat end face surfaces of the GRIN lenses 18 allow easy bonding or fusing of ends of the GRIN lenses 18 to end portions of the optical fibers 20 inside the GRIN lens holder 16, with the other end of the GRIN lenses 18 disposed on a mating face 24 of the GRIN lens holder 16, as illustrated in FIG. 1. The flat end face surfaces of the GRIN lenses 18 can also reduce aberrations.

Further, with continuing reference to FIG. 1, the end faces of the GRIN lenses 18 can be polished to be planar to slightly inset to the mating face 24 (e.g., within 0-25 μm). In some embodiments, the end faces of the GRIN lenses 18 may be slightly recessed with respect to the mating face 24 to avoid physical contact with the GRIN lenses of a mated optical connector to prevent damage to the GRIN lenses 18. If the offset distance between the end faces of the GRIN lenses 18 is too large, it may create a dirt collection recess. In alternative embodiments the end faces of the GRIN lenses 18 may be flush with the mating face 24. The flat surface of the GRIN lenses 18 allows for easy cleaning of end faces of the GRIN lenses 18. As will be discussed in more detail below, the GRIN lens holder 16 is designed with internal alignment features that support and align the GRIN lenses 18 within GRIN lens holder 16 and the plug 12 to avoid or reduce coupling loss between the GRIN lenses 18 and optical components optically connected to the GRIN lens 18 through a mating to the plug 12.

As will be described in more detail below, the GRIN lens holder 16 comprises a recessed cover 11 that aids in maintaining and positioning the GRIN lenses 18 within the GRIN lens holder 16. The recessed cover 11 has a front face 26 that is negatively offset from the mating face 24 of the GRIN lens holder 16 by an offset distance d such that the front face 26 does not contact a mating face of a mated GRIN lens holder or other optical interface of a plug or receptacle. The recessed front face 26 may provide for a more precise alignment of the GRIN lenses 18 with mated optical components of a mated plug or receptacle by reducing angular error that could arise if both the mating face 24 and the front face 26 of the recessed cover 11 contributed to the angular alignment of the GRIN lenses 18. Further, it may be easier to control angular error in both the X- and Y-axes using only one part (e.g., the mating face 24 of the GRIN lens holder 16) rather than two or more. For example, in devices where two components of a mating face must have surfaces that are coplanar, inevitable manufacturing tolerances will lead to cases where sometimes the face of one component is recessed, and sometimes where it is not. The offset distance d may be large enough so that the front face 26 of the recessed cover 11 does not contribute during mating, and small enough to not create a region of the optical interface on which debris may build-up and impact the transmission of optical signals through the GRIN lens holder 16. In one embodiment, the offset distance d is at least about 10 µm behind the mating face 24. However, it should be understood that other offset distance d values may be utilized depending on the particular application. It is noted that the offset distances d of the front faces illustrated throughout the features are not to scale and are exaggerated for illustrative purposes.

Figure 2C:
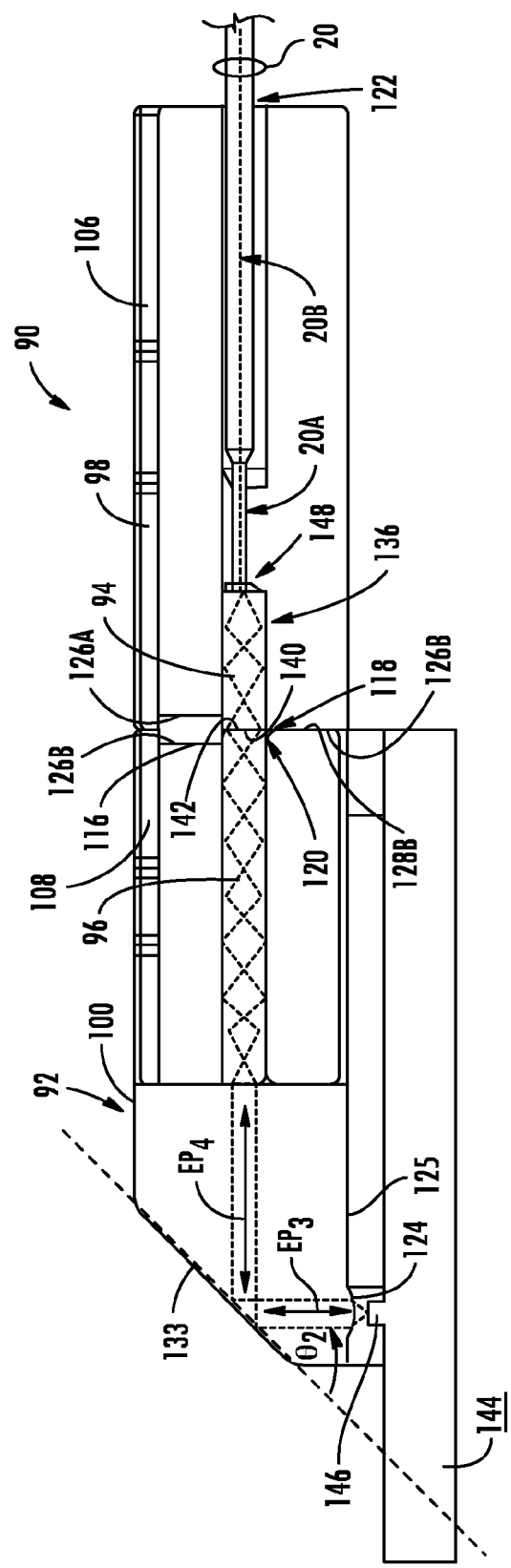
FIG. 2C is a side view of the GRIN lens holder for the plug mated to the GRIN lens holder for the receptacle shown in FIGS. 2A and 2B.

In this regard, FIGS. 2A and 2B are left and right perspective views, respectively, of an exemplary GRIN lens holder 90 of a plug (not shown) that can be mated with an exemplary GRIN lens holder 92 of a receptacle connector (not shown). FIG. 2C is a side view of the GRIN lens holders 90, 92 in FIG. 2A mated together. For example, the GRIN lens holder 90 could be disposed in a plug and the GRIN lens holder 92 could be disposed in a receptacle, such that when the plug and receptacle are mated, the GRIN lens holders 90, 92 are mated. Mating of the GRIN lens holders 90, 92 optically connects GRIN lenses 94 disposed in the GRIN lens holder 90 with GRIN lenses 96 disposed in the GRIN lens holder 92 for transmitting optical signals.

As discussed below, the lens holder bodies 98, 100 in this embodiment are also designed with raised sides 129A, 129B and 131A, 131B, respectively, which define internal chambers for receiving the recessed covers 106, 108. The raised sides 129A, 129B and 131A, 131B, which contribute to the mating face 24, can provide increased stability of the lens holder bodies 98, 100 in the Y-axis direction. In this embodiment, the GRIN lens holder 90 for the plug employs a lens holder body 98 that is configured with an open recess 102, 104 (FIGS. 3A, 3B) to receive a recessed cover 106 at or below the lens holder body 98 to close off internal chambers 110 (FIGS. 3A, 3B) disposed therein. The GRIN lenses 94 are disposed in the internal chamber 110 in groove alignment features 114 to align the GRIN lenses 94, 96 with the lens holder bodies 98, 100 and lens openings 118, 120 (FIGS. 2C, 3C) formed by the disposing of the recessed covers 106, 108 in the open recesses 102, 104 of the lens holder bodies 98, 100.

With continuing reference to FIGS. 2A-2C, by providing the open recesses 102, 104 in the lens holder bodies 98, 100, the GRIN lenses 94, 96 can be disposed in the lens holder bodies 98, 100 through the internal chambers 110, when the recessed covers 106, 108 are removed. An index matching gel, and/or index matching adhesive (e.g., epoxy or other) that has an index of refraction for index matching can then be disposed in the internal chambers 110, and the recessed covers 106, 108 disposed in the open recesses 102, 104 to seal off the internal chambers 110 and secure the GRIN lenses 94, 96 inside the lens holder bodies 98, 100. GRIN lens holders 90, 92 with separate lens holder bodies 98, 100 and recessed covers 106, 108 may be easily molded or stamped, a non-limiting example.

With continuing reference to FIGS. 2A-2C, the lens holder body 98 provides a mating face 126B for the plug, while the lens holder body 100 provides a mating face 128B for the receptacle. Additionally, the recessed covers 106, 108 have a front face 126A, 128A, respectively. As described above, only the mating faces 126B, 128B of the lens holder bodies 98, 100 contribute toward the mating of the lens holder body 98 of the plug with the lens holder body 100 of the receptacle because the front face 126A, 128A of the recessed covers 106,108 are negatively offset by distance d within the lens holder bodies 98, 100 (i.e., the front face of the cover is located behind the mating face of the lens holder body). Accordingly, the front face 126A of the recessed cover 106 associated with the lens holder body 98 of the plug does not physically contact the front surface 128A of the recessed cover 108 associated with the lens holder body 100 of the receptacle.

As illustrated in FIGS. 2A-2C, the mating face 126B of the GRIN lens holder 90 is configured to abut with the mating face 128B of the GRIN lens holder 92 to optically connect their respective supported GRIN lenses 94, 96. The GRIN lenses 94, 96 should be properly aligned with their respective GRIN lens holders 90, 92 and their respective mating faces 126B, 128B to avoid or reduce coupling losses when the mating faces 126B, 128B are abutted to each other to optically connect their respective supported GRIN lenses 94, 96. In this regard, the GRIN lens holders 90, 92 both contain the groove alignment features 114. The groove alignment features 114 are configured to support the GRIN lenses 94, 96 disposed in the GRIN lens holders 90, 92, and to align the GRIN lenses 94, 96 with the mating faces 126B, 128B. Also, in this embodiment, the groove alignment features 114 can be provided as part of an integrated structure of the GRIN lens holders 90, 92. For example, the groove alignment features 114 can be provided as part of a mold used to mold manufacture the GRIN lens holders 90, 92. Mold manufacturing the GRIN lens holders 90, 92 can reduce manufacturing steps, manufacturing cost, and provide accurate alignment of the supported GRIN lenses 94, 96.

As shown in FIG. 2C, a total internal reflection (TIR) surface 133 is provided in the lens holder body 100 to reflect light to and from the GRIN lenses 96 disposed therein. For example, the TIR surface 133 may be disposed at angle $\Theta_2$ relative to the emission path $EP_3$, which is forty-five (45) degrees in the non-limiting example of the lens holder body 100. Light can be received through lenses 124 from a transmitting optical device 146 disposed on a substrate shown as a printed circuit board 144 (PCB) and be emitted in emission path $EP_3$. This light is reflected off the TIR surface 133 into emission path $EP_4$ to the GRIN lenses 96. Similarly, light received from the GRIN lenses 96 in emission path $EP_4$ is reflected off the TIR surface 133 into emission path $EP_3$ and transmitted to the lenses 124, which can be received by a receiving optical device 146.

Figure 3A:
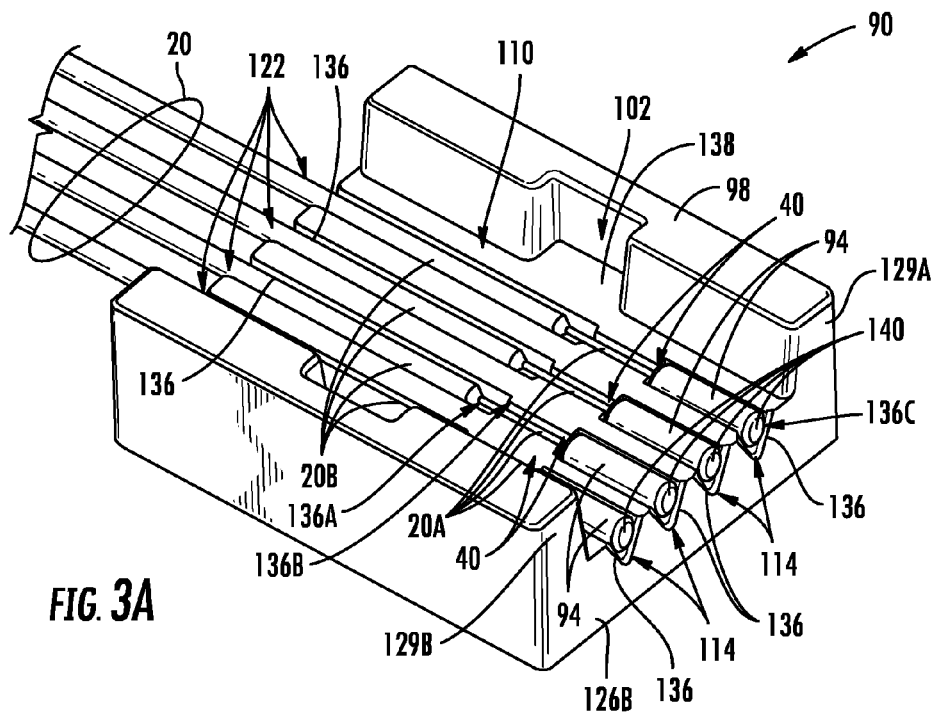
FIG. 3A is a close-up perspective view of the recessed cover GRIN lens holder in FIGS. 2A-2C with the recessed cover removed from the recessed lens holder body.
Figure 3B:
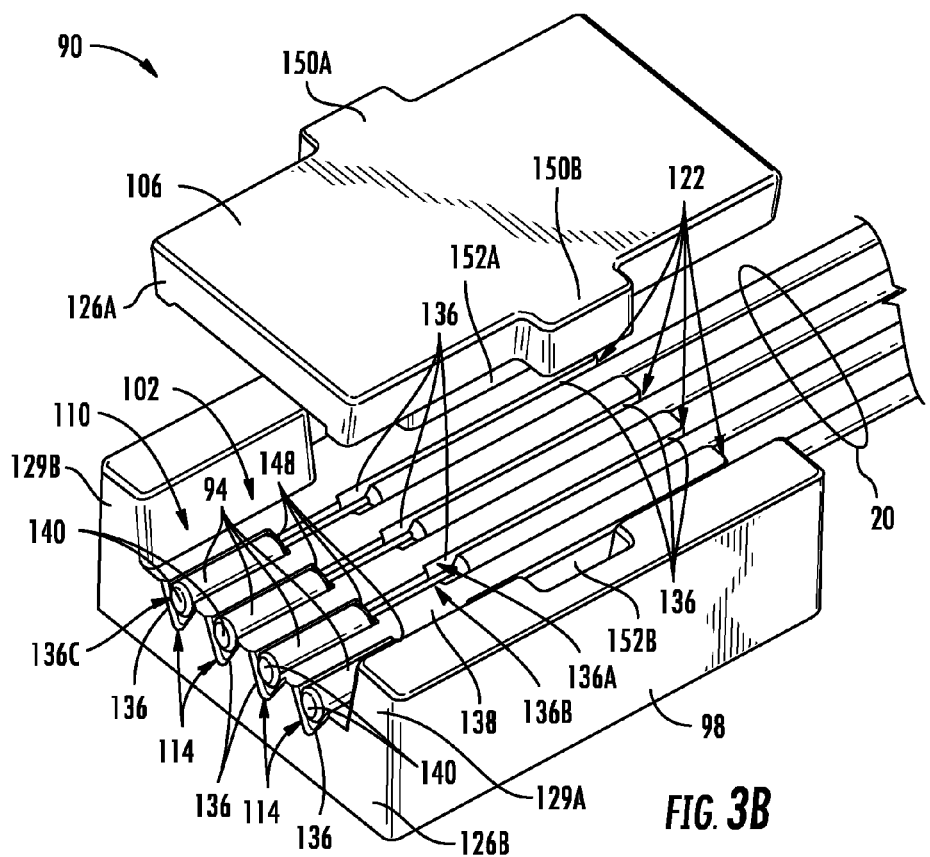
FIG. 3B is a close-up perspective exploded view of the recessed cover GRIN lens holder in FIGS. 2A-2C.
Figure 3C:
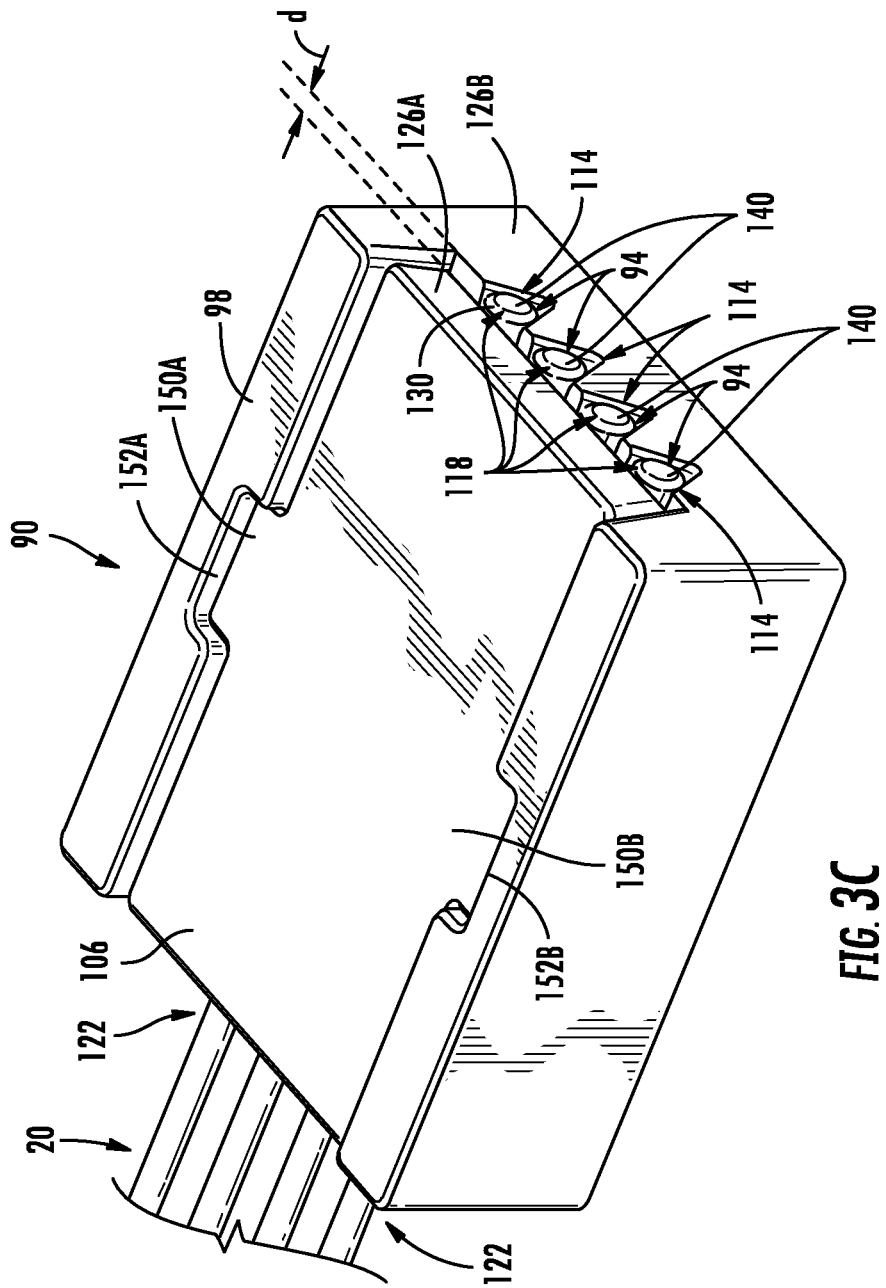
FIG. 3C is a close-up perspective assembled view of the recessed cover GRIN lens holder in FIGS. 2A-2C.

More detail regarding the GRIN lens holder 90 in FIGS. 3A-3C will now be discussed. FIG. 3A is a close-up perspective view of the GRIN lens holder 90 of FIGS. 2A and 2B with the recessed cover 106 removed from the lens holder body 98. FIGS. 3B, 3C are close-up perspective exploded and assembled views, respectively, of the GRIN lens holder 90 in FIGS. 2A, 2B. With reference to FIGS. 3A, 3B, the GRIN lenses 94 disposed in the lens holder body 98 of the GRIN lens holder 90 can be fused or optically connected to end portions 40 of bare optical fiber portions 20A of coated optical fiber portions 20B of the optical fibers 20 disposed in the internal chamber 110. The end portions 40 of the optical fibers 20 are disposed in any suitable groove alignment features provided such as V-shaped grooves 136 disposed in a recessed floor 138 of the internal chamber 110 of the lens holder body 98; however, other groove shapes are possible. The recessed floor 138 is disposed between the raised sides 129A, 129B, thereby forming the internal chamber 110. The V-shaped grooves 136 support and align the optical fibers 20 and the GRIN lenses 94 in the lens holder body 98. The V-shaped grooves 136 extend in the recessed floor 138 in lens holder body 98 to form the lens openings 118 to the light port openings 122, which are both coupled in free space to the internal chamber 110. The V-shaped grooves 136 in this embodiment are also comprised of three different groove sections 136A, 136B, 136C that each have different groove sizes to accommodate and securely support the different outer diameter sized coated optical fibers 20B, the bare optical fibers 20A, and GRIN lenses 94, respectively.

With continuing reference to FIGS. 3A-3C, to provide for locating the GRIN lenses 94 in close proximity to other optical components, such as the GRIN lenses 96, the mating face 126B is disposed in the lens holder body 98. The mating face 126B provides a planar or substantially planar mating surface for abutment to another optical component to bring end faces 140 of the GRIN lenses 94 in contact or close contact to the other optical components for light/signal transfer. In this example, the end faces 140 of the GRIN lenses 94, being planar to slightly inset to the mating face 126B (e.g., within 0-50 μm) may be optically connected to end faces 142 of the GRIN lenses 96 in the GRIN lens holder 92, as illustrated in FIG. 2C.

With continuing reference to FIGS. 3A-3C, to install the GRIN lenses 94 in the GRIN lens holder 90, the GRIN lenses 94 may be disposed in any suitable grooves such as the V-shaped grooves 136 in the internal chamber 110 or the like. The end faces 140 of the GRIN lenses 94 are planar to slightly inset with the mating face 126B (e.g., within 0-50 μm). It should be understood that the description of the GRIN lens holder 90 with reference to FIGS. 3A-3C are also applicable to the GRIN lens holder 92 of the receptacle as shown in FIGS. 2A-2C. An index matching gel, and/or index matching adhesive (e.g., epoxy or other) that has an index of refraction for index matching may be disposed in the open recess 102 to secure the GRIN lenses 94 in the V-shaped grooves 136 of the lens holder body 98 and to seal off access to the GRIN lenses 94 in the internal chamber 110 of the lens holder body 98. As discussed above, the optical fibers 20 may be disposed in the V-shaped grooves 136 in the lens holder body 98. End portions 40 of the bare optical fiber portions 20A, provided by removing coating from coated optical fiber portions 20B, may be inserted in the V-shaped grooves 136. The bare optical fiber portions 20A may be brought into contact, fused, or in close contact with the ends 148 of the GRIN lenses 94, as illustrated in FIG. 3B, to optically connect the optical fibers 20 with the GRIN lenses 94.

After the GRIN lenses 94 and optical fibers 20 are installed in the V-shaped grooves 136 in the lens holder body 98 in FIG. 3A and index matching gel, and/or index matching adhesive is inserted in the internal chamber 110, the recessed cover 106 is ready to be installed. As illustrated in FIG. 3B, the recessed cover 106 contains two mating features 150A, 150B that are configured to interface with two mating recesses 152A, 152B disposed in the lens holder body 98. The recessed cover 106 is inserted into the open recess 102 with the mating features 150A, 150B disposed in the recesses 152A, 152B. The front face 126A of the recessed cover 106 is negatively offset with respect to the mating face 126B of the lens holder body 98 by a distance d so that the front face 126A does not contribute to the angular alignment of the GRIN lenses 94, 96 during mating of the GRIN lens holder 90 of the plug and the GRIN lens holder 92 of the receptacle.

Figure 4A:
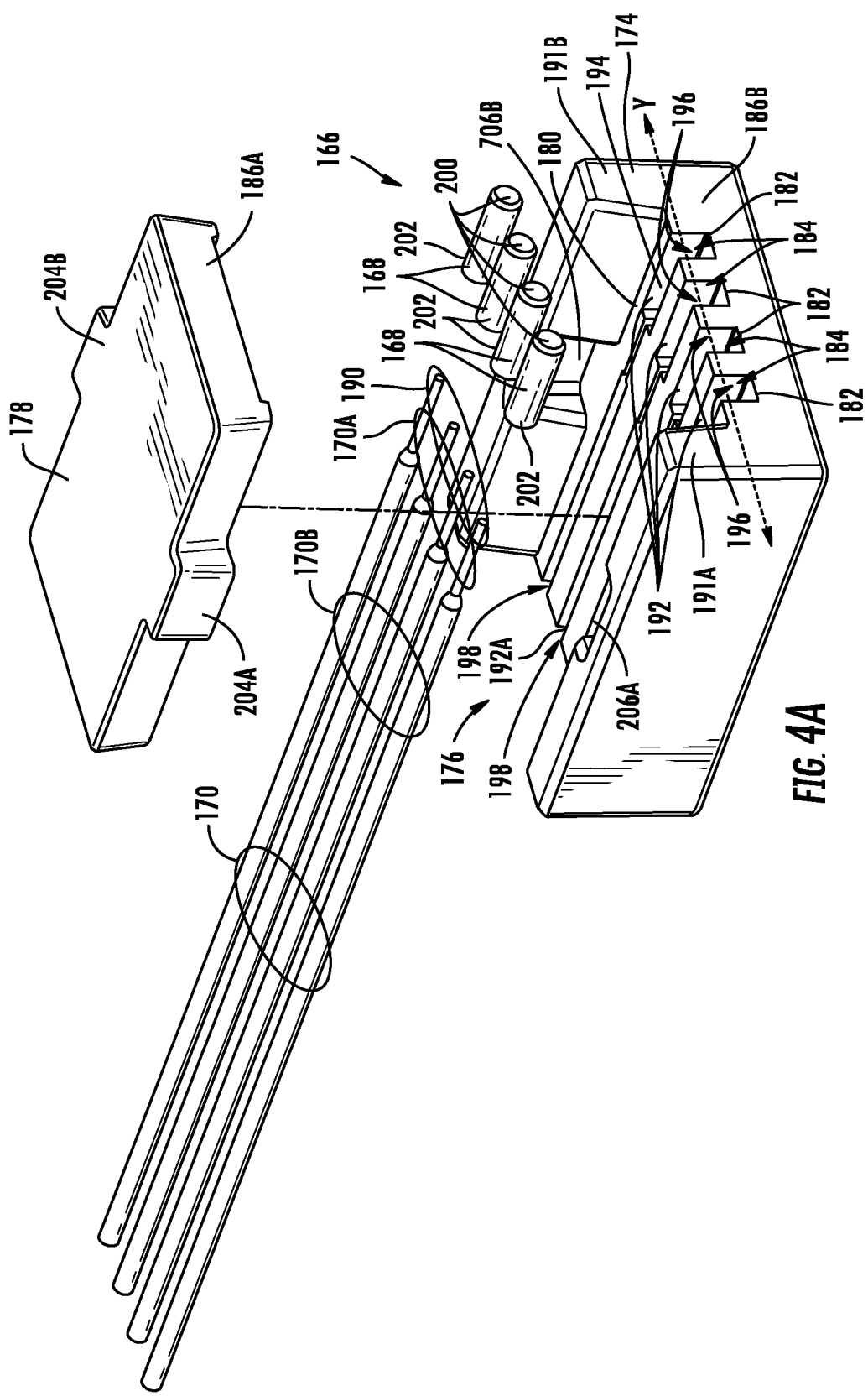
FIG. 4A is a close-up perspective exploded view of another exemplary plug GRIN lens holder employing a recessed cover lens holder body to optically connect GRIN lenses disposed in the plug with the GRIN lenses disposed in the receptacle.
Figure 4B:
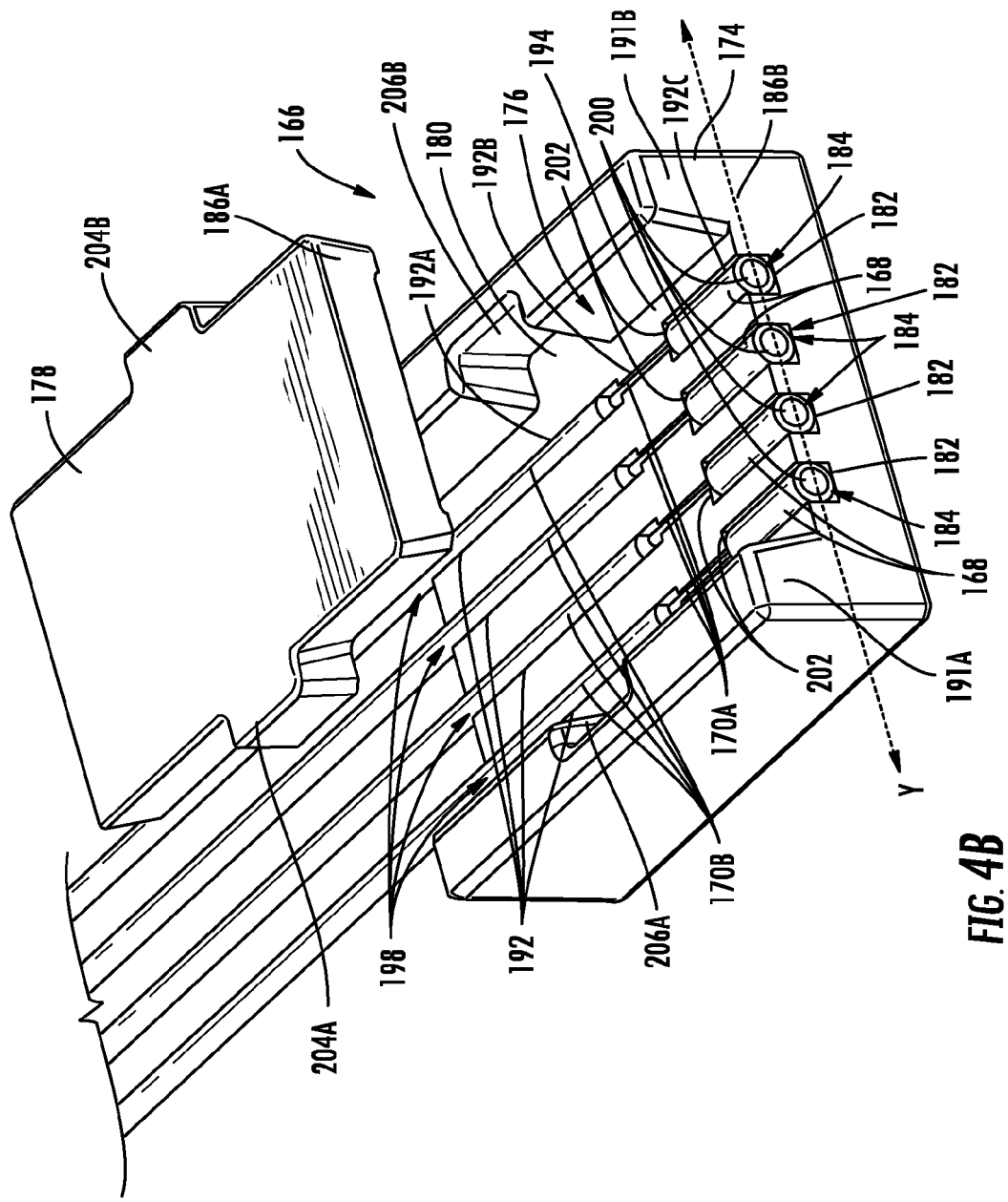
FIG. 4B is a close-up perspective exploded view of the recessed cover GRIN lens holder in FIG. 4A with optical fibers and GRIN lenses installed in the lens holder body.
Figure 4C:
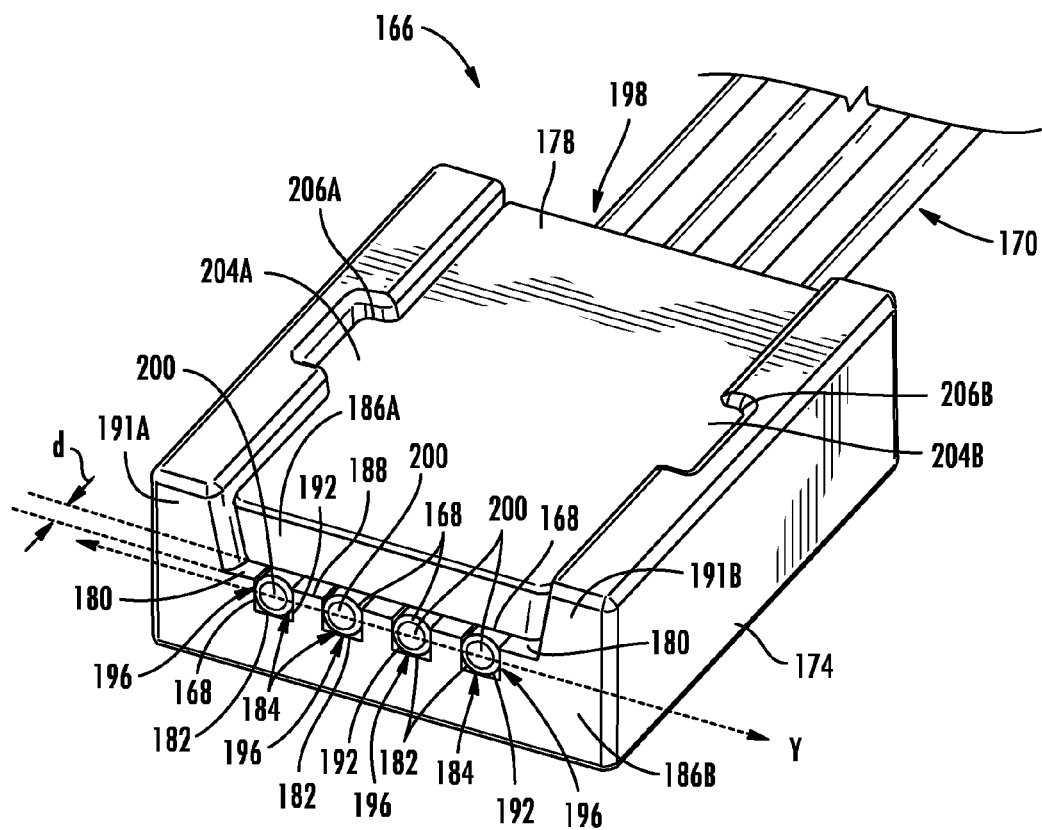
FIG. 4C is a close-up perspective assembled view of the recessed cover GRIN lens holder in FIGS. 4A and 4B showing a negative offset with respect to the mating face of the lens holder body.

FIG. 4A is a close-up perspective exploded view of a recessed cover GRIN lens holder 166 according to another embodiment. FIG. 4B is a close-up perspective exploded view of the recessed cover GRIN lens holder 166 in FIG. 4A with optical fibers and GRIN lenses installed. FIG. 4C is a close-up perspective assembled view of the recessed cover GRIN lens holder 166 in FIGS. 4A and 4B. The GRIN lens holder 166 in this embodiment employs a lens holder body 174 that is configured with an open recess 176 to receive a recessed cover 178 at or below the lens holder body 174 to close off an internal chamber 180 disposed therein. The GRIN lenses 168 are disposed in the internal chamber 180 in rectangular-shaped groove alignment features 182 to align the GRIN lenses 168 with the lens holder body 174 and lens openings 184 formed by the disposing of the recessed cover 178 in the open recess 176 of the lens holder body 174.

With continuing reference to FIGS. 4A-4C, by providing the open recess 176 in the lens holder body 174, the GRIN lenses 168 can be disposed in the lens holder body 174 through the internal chamber 180 when the recessed cover 178 is removed. An index matching gel, and/or index matching adhesive (e.g., epoxy or other) that has an index of refraction for index matching can then be disposed in the internal chamber 180, and the recessed cover 178 disposed in the open recess 176 to seal off the internal chamber 180 and secure the GRIN lenses 168 inside the lens holder body 174. The front surface 186A of the recessed cover 178 is negatively offset with respect to the mating face 186B of the lens holder body 174 by distance d so that the front surface 186A of the recessed cover 178 does not contribute to the angular alignment of the GRIN lenses 186 during mating of the GRIN lens holder 90. Further, as discussed below, the lens holder body 174 in this embodiment is also designed with raised sides 191A, 191B that define the internal chamber 180 for receiving the recessed cover 178. The raised sides 191A, 191B can provide increased stability of the lens holder body 174 in the Y-axis direction.

As illustrated in FIGS. 4A-4C, the mating face 186B of the GRIN lens holder 166 is configured to abut with a mating face of another GRIN lens holder to optically connect the supported GRIN lenses 168. The GRIN lenses 168 should be properly aligned in the GRIN lens holder 166 and the mating face 186B to avoid or reduce coupling losses when the mating face 186B is abutted to another mating face to optically connect the supported GRIN lenses 168. In this regard, as illustrated in FIGS. 4A-4C, the GRIN lens holder 166 contains rectangular-shaped groove alignment features 182. The rectangular-shaped groove alignment features 182 are configured to support the GRIN lenses 168 disposed in the GRIN lens holder 166, and to align the GRIN lenses 168 with the mating face 186B. Also, in this embodiment, the rectangular-shaped groove alignment features 182 can be provided as part of an integrated structure of the GRIN lens holder 166. For example, the rectangular-shaped groove alignment features 182 can be provided as part of a mold used to mold manufacture the GRIN lens holder 166. Mold manufacturing the GRIN lens holder 166 can reduce manufacturing steps, manufacturing cost, and provide accurate alignment of the supported GRIN lenses 168.

More detail regarding the GRIN lens holder 166 in FIGS. 4A-4C will now be discussed. With reference to FIG. 4A, the GRIN lenses 168 disposed in the lens holder body 174 of the GRIN lens holder 166 can be fused or optically connected to end portions 190 of bare optical fiber portions 170A of coated optical fiber portions 170B of the optical fibers 170 disposed in the internal chamber 180. The end portions 190 of the optical fibers 170 are disposed in rectangular-shaped groove alignment features 182 disposed in a recessed floor 194 of the internal chamber 180 of the lens holder body 174. The recessed floor 194 is disposed between the raised sides 191A, 191B. The rectangular-shaped grooves 192 support and align the optical fibers 170 and the GRIN lenses 168 in the lens holder body 174. The rectangular-shaped grooves 192 extend in the recessed floor 194 in lens holder body 174 to form the lens openings 196 to the light port openings 198. The rectangular-shaped grooves 192 in this embodiment are also comprised of three different groove sections 192A, 192B, 192C (FIG. 4B) that each have different groove sizes to accommodate and securely support the different outer diameter sized coated optical fibers 170B (such as a 250-micron coating of the optical fiber), the bare optical fibers 170A (such as a 80-125 micron glass of the optical fiber), and GRIN lenses 168 (such as a 400 micron lens), respectively as one explanatory example. Further, the groove sections are sized a few microns larger than the size of the intended component that fits within that portion of the groove. Simply stated, the groove alignment features change sizes and shapes from the front to the rear of the lens holder body to accommodate the different sized features of the components.

Using open grooves for the groove alignment feature is typically easier to manufacture with the desired tolerance and control. The open grooves are sized for receiving the lenses and portions of the optical fibers having different relevant sizes and optically aligning the same for making optical communication between components. Moreover, portions of the grooves may be arranged on different planes of the lens body holder to ensure proper optical fiber to lens alignment and/or lens to lens tilt alignment. By way of example, the optical fiber to lens is aligned to within 0.01 millimeters or less in the Y and Z directions and preferably aligned to within 0.008 millimeters or less in the Y and Z directions with respect to mating centerlines between devices; and, the lens tilt is within 0.5 degrees or less from a reference axis.

With continuing reference to FIGS. 4A-4C, to provide for locating the GRIN lenses 168 in close proximity to other optical components, the mating face 186B is disposed in the lens holder body 174. The mating face 186B provides a planar or substantially planar mating surface for abutment to another optical component to bring end faces 200 of the GRIN lenses 168 in contact or close contact to the other optical components for light transfer. In this example, the end faces 200 of the GRIN lenses 168, being planar to slightly inset to the mating face 186B (e.g., within 0-50 μm), can be optically connected to end faces of other GRIN lenses 96 in another mated GRIN lens holder 92 in FIG. 2B.

With continuing reference to FIGS. 4A-4C, to install the GRIN lenses 168 in the GRIN lens holder 166, the GRIN lenses 168 may be disposed in the rectangular-shaped grooves 192 in the internal chamber 180. The end faces 200 of the GRIN lenses 168 are planar to slightly inset with the mating face 186B (e.g., within 0-50 μm). An index matching gel, and/or index matching adhesive (e.g., epoxy or other) that has an index of refraction for index matching may be disposed in the open recess 176 to secure the GRIN lenses 168 in the rectangular-shaped grooves 192 of the lens holder body 174 and to seal off access to the GRIN lenses 168 in the internal chamber 180 of the lens holder body 174. As discussed above, the optical fibers 170 may be disposed in the rectangular-shaped grooves 192 in the lens holder body 174. End portions 190 of the bare optical fiber portions 170A, provided by removing coating from coated optical fiber portions 170B, may be inserted in the rectangular-shaped grooves 192. The bare optical fiber portions 170A may be brought into contact, fused, or in close contact with the ends 202 of the GRIN lenses 168, to optically connect the optical fibers 170 with the GRIN lenses 168.

After the GRIN lenses 168 and optical fibers 170 are installed in the rectangular-shaped grooves 192 in the lens holder body 174 in FIG. 4B and index matching gel and/or index matching adhesive is inserted in the internal chamber 180, the recessed cover 178 is ready to be installed. As illustrated in FIG. 4C, the recessed cover 178 contains two mating features 204A, 204B that are configured to interface with two mating recesses 206A, 206B disposed in the lens holder body 174. The recessed cover 178 is inserted into the open recess 176 with the mating features 204A, 204B disposed in the recesses 206A, 206B. The front surface 186A of the recessed cover 178 is negatively offset from the mating face 186B within the internal chamber 180 by a distance d.

Figure 5A:
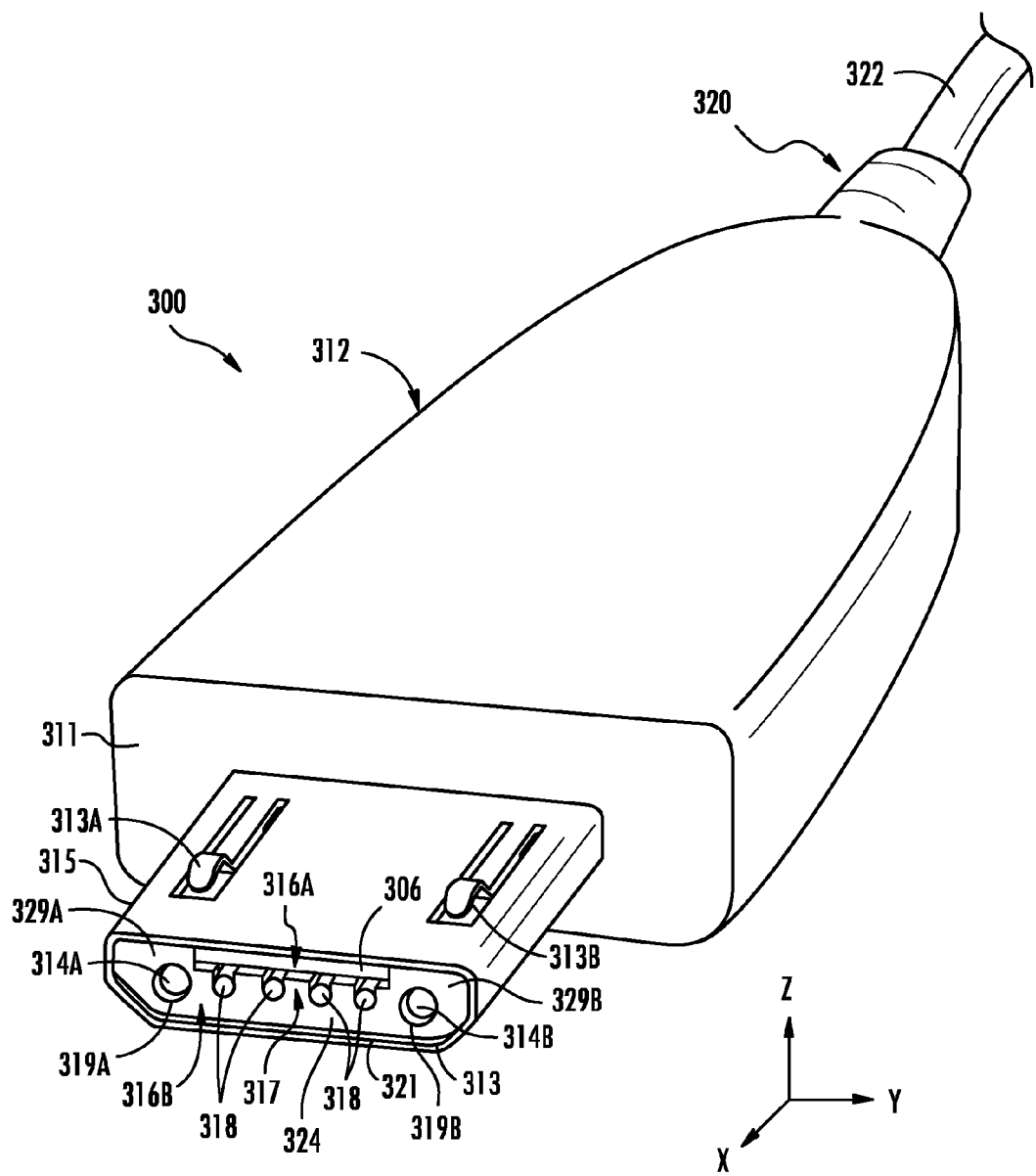
FIG. 5A is a front perspective view of a optical connector having a GRIN lens holder and a recessed cover within another explanatory plug.

Referring now to FIGS. 5A-6C, an exemplary optical connector configured as a plug 300 and exemplary optical connector configured as a receptacle 330 according to one embodiment are schematically illustrated. FIG. 5A is an assembled perspective view of an exemplary plug 300 of an optical cable assembly. FIG. 5B is an assembled perspective view of an exemplary receptacle 330 that may be associated with an electronic device. FIGS. 6A-6C schematically illustrate the mating of the plug 300 with the receptacle 330 depicted in FIGS. 5A and 5B.

Referring specifically now to FIG. 5A, the plug 300 generally comprises a connector body 312 having a connector housing 315 extending from a front surface 311 of the connector body 312. The plug 300 further comprises optical fibers 320 disposed in a cable 322 secured to the connector body 312. The connector housing 315 defines a plug portion 310 that may be inserted into the receptacle 330. The illustrated connector housing 315 comprises optional engagement features 313A, 313B that are configured to engage mated engagement features 335A, 335B of a receptacle connector housing 332, as described below.

The connector housing 315 defines an optical connector opening 321 that exposes a GRIN lens holder 317 that is maintained in an enclosure 313 within the connector housing 315. As depicted in FIGS. 6A-6B, the GRIN lens holder 317 of the particular embodiment is configured to translate along an x-axis (i.e., an optical axis of the plug 300) within the connector housing 315. Still referring to FIG. 5A, the GRIN lens holder 317 comprises a lens holder body 324 having a mating face 316B, and is configured with an open recess to receive a recessed cover 306 at or below the lens holder body 324 to close off an internal chamber (not shown) disposed therein. The GRIN lenses 318 are disposed in the internal chamber in rectangular-shaped groove alignment features to align the GRIN lenses 318 with the mating face 316B of the lens holder body 324.

With continuing reference to FIG. 5A, the GRIN lenses 318 can be disposed in the lens holder body 324 through the internal chamber when the recessed cover 306 is removed, as described above with respect to FIGS. 2A-4C. The end faces of the GRIN lenses 318 are planar to slightly inset with respect to the mating face 316B of the lens holder body 324 (e.g., within 0-50 μm). An index matching gel, and/or index matching adhesive (e.g., epoxy or other) that has an index of refraction for index matching can then be disposed in the internal chamber, and the recessed cover 306 disposed in an open recess to seal off the internal chamber from dust and debris and secure the GRIN lenses 318 inside the lens holder body 324. The front surface 316A of the recessed cover 306 is negatively offset with respect to the mating face 316B of the lens holder body 324 by a distance d so that the front surface 316A of the recessed cover 306 does not contribute to the angular alignment of the GRIN lenses 318 during mating of the GRIN lens holder 317. Further, the lens holder body 324 in this embodiment is also designed with raised sides 329A, 329B that define the internal chamber for receiving the recessed cover 306. The raised sides 329A, 329B can provide increased stability of the lens holder body 324 in the Y-axis direction. The lens holder body 324 may comprise the internal groove alignment features to maintain the optical fiber (not visible) within the lens holder body 324, as described above with reference to FIGS. 2A-4C.

With reference to FIGS. 5A and 6A-6C, the lens holder body 324 of the illustrated embodiment further comprises a first bore 319A and a second bore 319B. The first and second bores 319A, 319B are located proximate to raised sides 329A, 329B, respectively, in the illustrated embodiment. The plug 300 further comprises connector body enclosure 340 through which a first pin 314A and a second pin 314B extend longitudinally through the connector housing 315 along the x-axis, or optical axis, of the plug 300. The GRIN lens holder 317 is located within the enclosure 313 defined by the connector housing 315 such that the first pin 314A is disposed in the first bore 319A, and the second pin 314B is disposed within the second bore 319B. The exemplary plug 300 further comprises a first bias member 341A (not visible in the figures) and a second bias member 341B that are disposed about the first and second pins 319A, 319B, respectively, within the connector body enclosure 340. The illustrated first and second bias members 341A, 341B are configured as compression springs. As described in more detail below with specific reference to FIGS. 6A-6C, the GRIN lens holder 317 is operable to translate within the connector housing 315 along the first and second pins 314A during mating, 314B such that the first and second bias members 341A, 341B act to bias the GRIN lens holder 317 toward the optical connector opening 321.

Figure 5B:
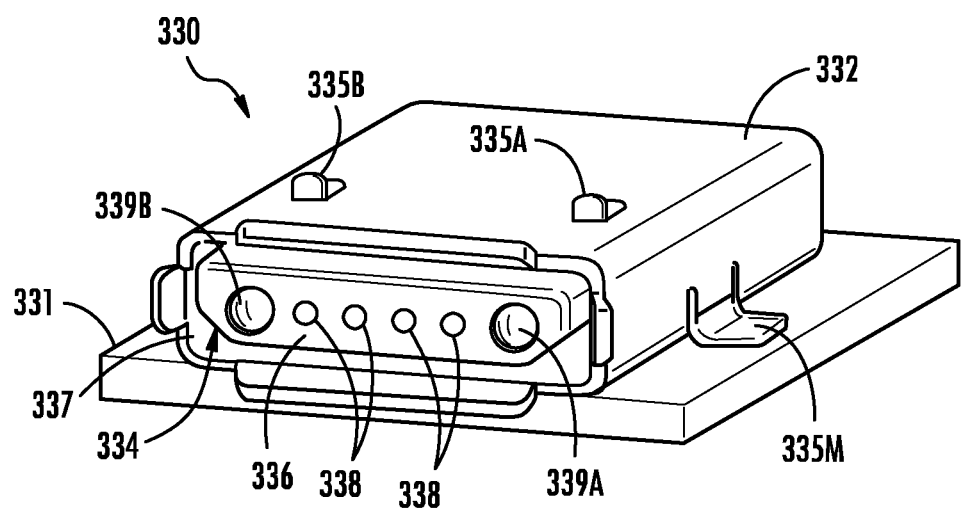
FIG. 5B is a front perspective view of a receptacle connector having a GRIN lens holder and configured to mate with the optical connector in FIG. 5A.

Referring now to FIG. 5B, an exemplary receptacle 330 is illustrated. The receptacle 330 may provide a communications port for an electronic device, such as, but not limited to, a personal computer, an electronic data storage device, a tablet computer, a mobile communications device, and an application specific computing device. The receptacle 330 illustrated in FIG. 5B generally comprises a receptacle housing 332 that is coupled to a PCB 331, which may be a PCB maintained within a housing of an electronic device. The exemplary receptacle housing 332 comprises mounting tabs 335M which may be used to couple the receptacle housing 332 to the PCB 331, such as by the use of solder or an adhesive. The receptacle housing 332 further comprises engagement features 335A, 335B that are configured to removably engage with the engagement features 313A, 313B of the plug 300 when the two components are coupled together.

The receptacle 330 further comprises a GRIN lens holder 334 disposed within an enclosure defined by the receptacle housing 332 such that a gap 337 exists between an outer surface of the GRIN lens holder 334 and an inner surface of the receptacle housing 332. As described in more detail below with reference to FIGS. 6A-6C, the gap 337 is configured to receive the connector housing 315 when the plug 300 is inserted into the receptacle 330. The illustrated GRIN lens holder 334 comprises a seamless, planar mating face 336 that is configured to couple with the mating face 316B of the GRIN lens holder 317 of the plug 300. Although the illustrated GRIN holder 334 is depicted as a single-piece component in FIG. 5B, embodiments are not limited thereto. As an example and not a limitation, the GRIN lens holder 334 may comprise a multi-component assembly comprising a lens holder body and a recessed cover, as described above with respect to FIGS. 2A-2C. Further, a multi-component receptacle GRIN lens holder may have groove alignment features having the geometric configurations depicted in FIGS. 2A-4C, as well as other geometric configurations not illustrated.

GRIN lenses 338 are disposed within the GRIN lens holder 334 such that end faces of the GRIN lenses 338 are planar to slightly inset with respect to the mating face 336 (e.g., within 0-50 μm). The GRIN lenses 338 should be arranged within the GRIN lens holder 334 for alignment with the GRIN lenses 318 of the plug 300 when the plug 300 is mated with the receptacle 330.

The GRIN lens holder 334 additionally comprises a first bore 339A and a second bore 339B adjacent to the GRIN lenses 338 and configured to receive the first and second pins 314A, 314B of the plug 300, respectively, when the plug 300 is inserted into the receptacle 330. As described in more detail below, the first and second pins 314A, 314B of the plug 300 and the first and second bores 339A, 339B of the receptacle 330 provide an optical alignment of the mated GRIN lenses 318, 338.

Referring now to FIGS. 6A-6C, internal components of the plug 300 and the receptacle 330 are schematically illustrated in partial cutaway, perspective views to depict the coupling of the plug 300 with the receptacle 330. FIG. 6A depicts the plug 300 positioned away from the receptacle 330, FIG. 6B depicts the plug 300 approaching the receptacle 330, and FIG. 6C depicts the plug 300 engaged with the receptacle 330 in a fully mated relationship. As the user pushes the plug 300 toward the receptacle 330, the mating surface 316B of the GRIN lens holder 317 associated with the plug 300 contacts the mating face 336 of the GRIN lens holder 334 associated with the receptacle 330. The end faces of the GRIN lenses 318 disposed in the GRIN lens holder 317 of the plug 300 contact, or nearly contact, the end faces of the GRIN lenses 338 disposed in the GRIN lens holder 334 of the receptacle 330 such that the GRIN lenses 318, 338 are optically aligned and optical signals may pass therebetween.

The first and second pins 314A, 314B of the plug 300 are positioned within the first and second bores 339A, 339B, respectively, as the plug 300 is inserted into the receptacle 330. Referring specifically to FIG. 6C, as the plug 300 is pushed into the receptacle 330, the mating surface 316B of the GRIN lens holder 317 of the plug 300 is pushed against the mating face 336 of the GRIN lens holder 317 of the receptacle 330 such that the GRINS lens holder 317 is translated back within the connector housing 315 and is disposed within the connector body enclosure 340 when the plug 300 is fully engaged with the receptacle 330. The first and second bias members 341A, 341B are compressed within the connector body enclosure 340. Additionally, the connector housing 315 is disposed within the gap 337 of the receptacle 330 such that the engagement features 313A, 313B (it is noted that engagement feature 313B is not visible in FIGS. 6A-6C) of the plug 300 engage the engagement features 335A, 335B (it is noted that engagement feature 335B is not visible in FIGS. 6A-6C) to retain the plug 300 and the receptacle 330 in a mated connection.

FIGS. 6A-6C also show GRIN lens holder 315 using the concepts of the bore relief zone. The first and second bore relief zones (not numbered) are a regions of the GRIN lens holder body 315 where material is removed such that the first and second alignment pins 314A, 314B are exposed and not enclosed by the GRIN lens holder body in these regions or zones. The removed material (i.e., the gap or opening) reduces the friction force and provides cleaning by wiping during mating/unmating of the GRIN lens holder body translates on the pins 314A,314B.

When the plug 300 is fully engaged within the receptacle 330 the mating surface 316B of the plug 300 physically contacts the mating face 336 of the receptacle 330 such that the front surface 316A of the recessed cover 306 does not contribute to angular alignment. As described above, the GRIN lens holder 334 of the receptacle 330 may comprise a TIR surface 333 that is provided to reflect light to and from the GRIN lenses 338 disposed therein. Light can be received through lenses (not shown in FIGS. 6A-6C) from a transmitting optical device (e.g., a laser diode) disposed on the PCB 332. This light may be reflected off the TIR surface 333 into the GRIN lenses 338. Similarly, light received from the GRIN lenses 338 may be reflected off the TIR surface 333 and focused by the lenses, which may be received by a receiving optical device (see FIG. 2A).

The plug 300 may be disengaged from the receptacle 330 by pulling the plug 300 away from the electronic device that incorporates the receptacle 330, such that the engagement features 313A, 313B and 335A, 335B disengage from one another. While the plug 300 is removed from the receptacle 330, the bias members 341A, 341B translate the GRIN lens holder 317 back toward the connector opening such that the mating surface 316B and GRIN lenses 318 may be user-accessible (e.g., for cleaning purposes).

It should now be understood that embodiments described herein are directed to GRIN lens holders and optical connectors employing groove alignment feature(s) and a recessed cover. The recessed cover may have a front face that is recessed from a mating face of the GRIN lens holder. With this arrangement, the front face does not contribute to the mechanical coupling of the GRIN lens holder to a mated connector or receptacle, thereby minimizing angular alignment errors.

As non-limiting examples, the GRIN lenses disclosed herein may comprise a generally cylindrical glass member having a radially varying index of refraction, the glass member having a length such that the lens has a suitable pitch. Simply stated, by varying the physical length of GRIN lens the focal length of the GRIN lens may be adjusted and tailored as desired. As used herein, the pitch length of a given lens is calculated by $2\pi$ divided by the square root of a gradient constant of the GRIN lens as known in the art. Moreover, the GRIN lenses can have a fractional pitch that is tailored by the physical length of the lens. By way of example, the pitch is about 0.25 or more, but may have other values as desired. Some embodiments relate to small diameter lenses, such as lenses having a diameter less than or equal to about one (1) mm, for example, 0.8 mm or less such as in the range of from 0.4 mm to 0.5 mm. In certain embodiments, lenses having a diameter less than about 1 mm are operative to produce a beam having a diameter between about 350 µm and 450 µm when illuminated with a beam having a numerical aperture between 0.25 and 0.35.

Examples of optical devices that can interface with the GRIN lenses disclosed in the GRIN lens holders disclosed herein include, but are not limited to, optical transmitters and receivers such as used in optical connections or the like.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A gradient index (GRIN) lens holder, comprising:
   a lens holder body for mating with a complementary device, the lens holder body comprising a mating face and an internal chamber;
   at least one groove alignment feature disposed in the internal chamber of the lens holder body, the at least one groove alignment feature configured to support at least one GRIN lens disposed in the internal chamber; and
   a recessed cover comprising a front face and at least one mating feature, the recessed cover disposed in the internal chamber such that the front face of the recessed cover is negatively offset with respect to the mating face of the lens holder when attached, and the mating feature interfaces with a corresponding mating recess in the lens holder body.

2. The GRIN lens holder of claim 1, further comprising a recessed floor disposed in the internal chamber, a first raised side disposed on a first side of the recessed floor, and a second raised side disposed on a second side of the recessed floor, wherein the recessed cover is disposed in the internal chamber between the first raised side and the second raised side of the lens holder body.

3. The GRIN lens holder of claim 1, wherein the at least one groove alignment feature is comprised of at least one first groove disposed on a first end portion of the internal chamber and at least one second groove disposed on a second end portion of the internal chamber.

4. The GRIN lens holder of claim 1, wherein the at least one groove alignment feature is comprised of at least one V-shaped groove.

5. The GRIN lens holder of claim 1, wherein the at least one groove alignment feature is comprised of three different rectangular-shaped groove sections.

6. The GRIN lens holder of claim 1, further comprising at least one light port opening disposed in the lens holder body and coupled in free space to the internal chamber, the at least one light port opening is configured to receive at least one end portion of at least one optical fiber.

7. The GRIN lens holder of claim 1, wherein the front face of the recessed cover is negatively offset with respect to the mating face of the lens holder body by greater than 10 µm.

8. The GRIN lens holder of claim 1, wherein the at least one groove alignment feature comprises four groove alignment features, and the at least one GRIN lens comprises four GRIN lenses.

9. A gradient index (GRIN) lens holder, comprising:
a lens holder body for mating with a complementary device, the lens holder body comprising a mating face and an internal chamber;
at least one groove alignment feature disposed in the internal chamber of the lens holder body, the at least one groove alignment feature configured to support at least one GRIN lens disposed in the internal chamber; and
a recessed cover comprising a front face, the recessed cover disposed in the internal chamber such that the front face of the recessed cover is negatively offset by greater than 10 µm with respect to the mating face of the lens holder when attached; wherein the recessed cover further comprises at least one mating feature that interfaces with a corresponding mating recess disposed in the lens holder body.

10. The GRIN lens holder of claim 9, further comprising a recessed floor disposed in the internal chamber, a first raised side disposed on a first side of the recessed floor, and a second raised side disposed on a second side of the recessed floor, wherein the recessed cover is disposed in the internal chamber between the first raised side and the second raised side of the lens holder body.

11. The GRIN lens holder of claim 9, wherein the at least one groove alignment feature is comprised of at least one first groove disposed on a first end portion of the internal chamber and at least one second groove disposed on a second end portion of the internal chamber.

12. The GRIN lens holder of claim 9, wherein the at least one groove alignment feature is comprised of at least one V-shaped groove.

13. The GRIN lens holder of claim 9, further comprising at least one light port opening disposed in the lens holder body and coupled in free space to the internal chamber, the at least one light port opening is configured to receive at least one end portion of at least one optical fiber.

14. The GRIN lens holder of claim 9, wherein the at least one groove alignment feature comprises four groove alignment features, and the at least one GRIN lens comprises four GRIN lenses.

15. A gradient index (GRIN) lens holder, comprising:
a lens holder body for mating with a complementary device, the lens holder body comprising a mating face and an internal chamber;
at least one groove alignment feature disposed in the internal chamber of the lens holder body, the at least one groove alignment feature configured to support at least one GRIN lens disposed in the internal chamber, wherein the at least one groove alignment feature is comprised of at least one first groove disposed on a first end portion of the internal chamber and at least one second groove disposed on a second end portion of the internal chamber; and
a recessed cover comprising a front face, the recessed cover disposed in the internal chamber such that the front face of the recessed cover is negatively offset with respect to the mating face of the lens holder when attached; wherein the recessed cover further comprises at least one mating feature that interfaces with a corresponding mating recess disposed in the lens holder body.

* * * * *